(12) United States Patent
Verstraeten

(10) Patent No.: US 6,957,813 B2
(45) Date of Patent: Oct. 25, 2005

(54) GRIPPING DEVICE WITH ELECTROMAGNETIC ACTUATING MEANS

(75) Inventor: Eric Verstraeten, Sint-Niklaas (BE)

(73) Assignee: Elaut N.V., Sint-Niklaas (BE)

( * ) Notice: Subject to any disclaimer, the term of this patent is extended or adjusted under 35 U.S.C. 154(b) by 0 days.

(21) Appl. No.: 10/398,141

(22) PCT Filed: Oct. 4, 2001

(86) PCT No.: PCT/EP01/11611
  § 371 (c)(1),
  (2), (4) Date: Sep. 2, 2003

(87) PCT Pub. No.: WO02/28496
  PCT Pub. Date: Apr. 11, 2002

(65) Prior Publication Data
  US 2004/0026865 A1 Feb. 12, 2004

(30) Foreign Application Priority Data
  Oct. 4, 2000 (BE) ............................................. 2000/0632

(51) Int. Cl.⁷ .................................................. A63F 9/00
(52) U.S. Cl. ..................................................... 273/448
(58) Field of Search ................................ 273/440, 447, 273/448, 456; 294/88, 97, 106, 111

(56) References Cited

U.S. PATENT DOCUMENTS

| 4,460,855 A | * | 7/1984 | Kelly .......................... 318/135 |
| 4,684,128 A | * | 8/1987 | Verstraeten .................. 273/448 |
| 4,685,673 A | | 8/1987 | Verstraeten |
| 4,718,667 A | | 1/1988 | Shoemaker, Jr. |
| 5,719,451 A | * | 2/1998 | Cook et al. ...................... 310/12 |
| 6,002,184 A | * | 12/1999 | Delson et al. ................. 310/14 |
| 6,283,475 B1 | * | 9/2001 | Stubben ........................ 273/448 |
| 6,428,070 B1 | * | 8/2002 | Takanashi et al. ............. 294/88 |
| 2004/0026865 A1 | * | 2/2004 | Verstraeten .................. 273/448 |

FOREIGN PATENT DOCUMENTS

| EP | 0875981 A1 | 11/1998 |
| JP | 11114865 | 4/1999 |

OTHER PUBLICATIONS

"Linear Magnetic Actuator" IBM Technical Disclosure Bulletin, IBM Corp. New York, US, vol. 35, No. 3, 1992, pp. 39–40.

* cited by examiner

Primary Examiner—Raleigh W. Chiu
(74) Attorney, Agent, or Firm—The Webb Law Firm

(57) ABSTRACT

A device for grasping and subsequently displacing an object to a delivery position, comprising a gripper suspended from a trolley and provided with at least three prongs which are each pivotable relative to a carrier and which are displaceable by control means from a spread position to a closing position and vice versa, wherein the control means are formed by a coil connected to the carrier and a magnetic core which is movable in the coil and coupled to the prongs and which consists of a system of permanent magnets, which coil can be energized by a current, wherein the magnets are disposed such that their combined flux will form a constant pattern relative to the coil in all positions, whereby the gripping force is constant in the diverse closing positions.

1 Claim, 2 Drawing Sheets

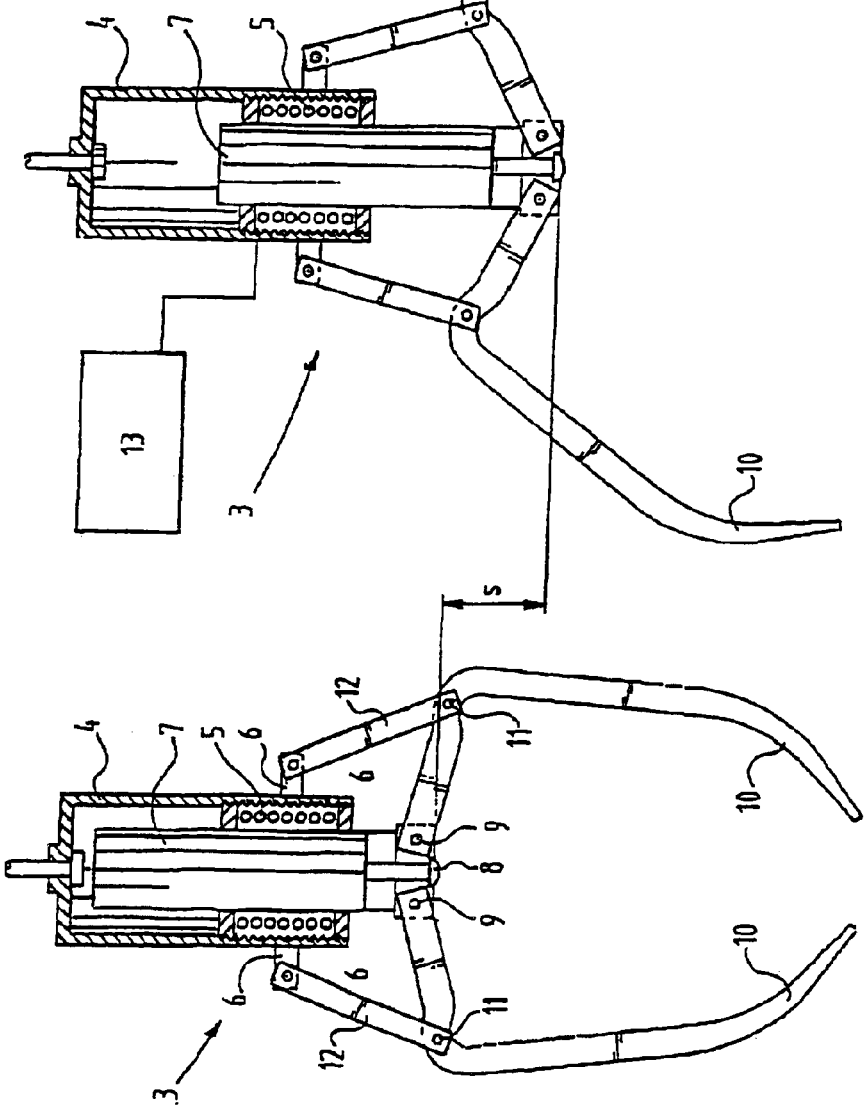

GRIPPING DEVICE WITH ELECTROMAGNETIC ACTUATING MEANS

BACKGROUND OF THE INVENTION

1. Field of the Invention

The invention relates to a device for grasping and subsequently displacing an object to a delivery position.

This principle has been used in linear motors to quicken the responsiveness, as described in JP 11114865, published Apr. 27, 1999.

2. Brief Description of the Related Art

Such a device is of random nature, but is usually applied in amusement devices, wherein a large number of objects are displayed in a display cabinet, and wherein by means of handles the user can carry a gripper in a coordinate system to the desired object, whereafter the gripper is further driven automatically and, in the case of success, grasps this object. The object is then carried to a delivery position. Such grasping devices applied in an amusement machine are for example known from U.S. Pat. Nos. 4,718,667 and 4,685,673.

U.S. Pat. No. 4,718,667 describes a control system for positioning the claw anyhere in the housing, whereafter the claw is lowered, closed, raised and returned to the home position. In the claw device of U.S. Pat. No. 4,718,667 a solenoid operated plunger is controlled by a solenoid within the housing. U.S. Pat. No. 4,685,673 describes a positioning system with two sets of rails for moving the grasping device within the housing.

The drawback of existing gripping devices is that the gripping force is often not constant, whereby the gripping process is not predictable.

SUMMARY OF THE INVENTION

The object of the invention is to improve the gripping device itself, in particular the control thereof.

The device according to the invention is distinguished in that the control means are formed by a coil connected to the carrier and a magnetic core which is movable in the coil and coupled to the prongs and which consists of a system of permanent magnets, which coil can be energized by a current, wherein the magnets are disposed such that their combined flux will form a constant pattern relative to the coil in all positions.

Owing to the use of the specially formed core in the control coil it is possible during the movement stroke to keep the closing force of the gripper constant or practically constant in the diverse closing positions.

In a preferred embodiment the magnets in the magnetic system are arranged at an axial distance relative to each other which is equal to or practically equal to the stroke length of the core, wherein the magnetic poles are placed in opposite position relative to each other.

The above mentioned and other features of the invention will be elucidated hereinbelow with reference to a figure description.

BRIEF DESCRIPTION OF THE DRAWINGS

In the drawing:

FIGS. 2A and 2B are schematic representations of the gripper with control device in the closing respectively spread position; and FIG. 3 is a detail of the core of the coil accommodated in the control system.

DETAILED DESCRIPTION OF THE PREFERRED EMBODIMENTS

Figure 1:
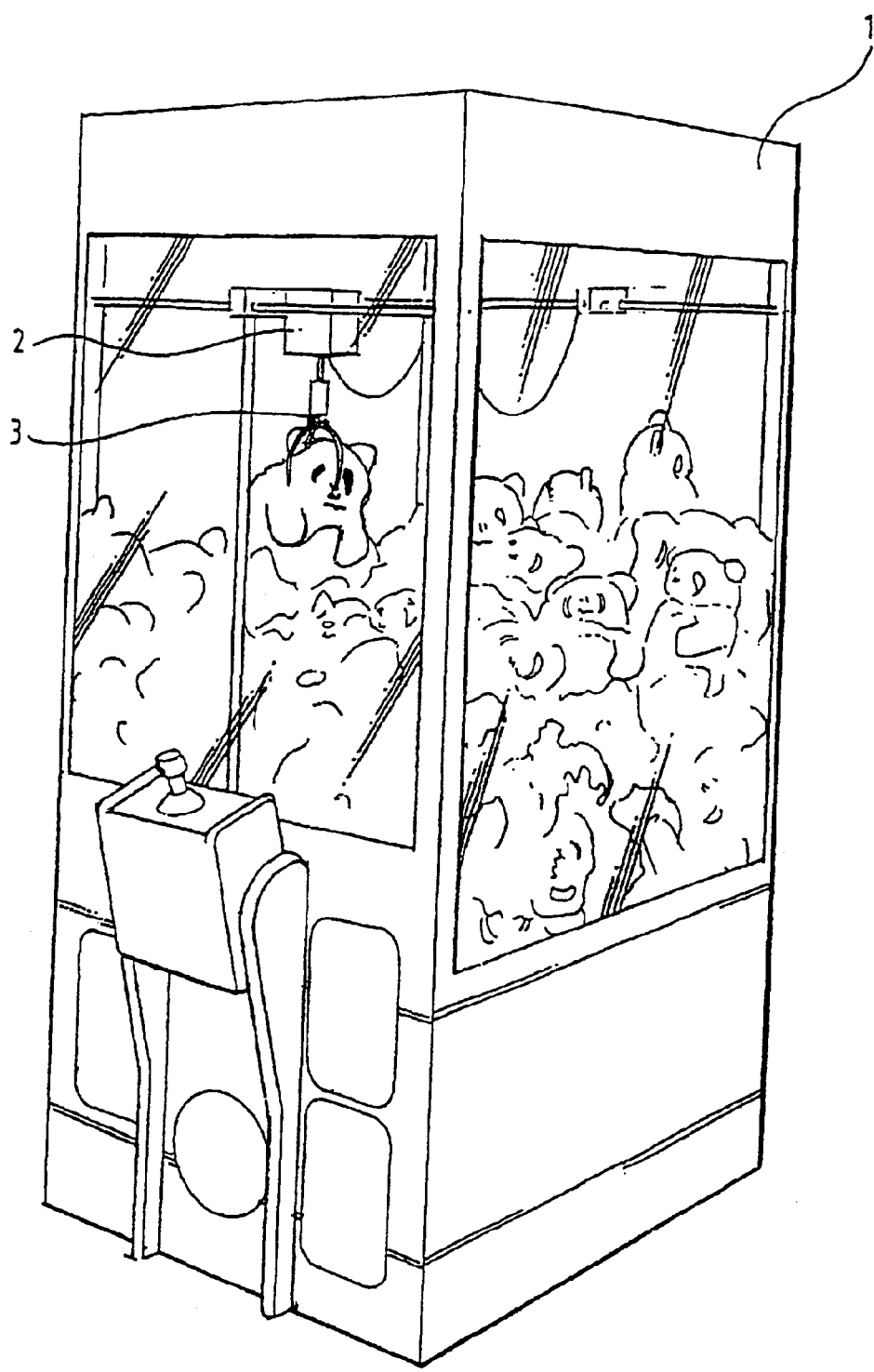
FIG. 1 is a perspective view of an amusement device provided with a gripping device according to the invention.

Designated in the figures with the numeral 1 is a cabinet which can be embodied in random manner, wherein in the upper part there is arranged a rail along which a trolley 2 can move, and from which trolley a gripping member according to the invention 3 is suspended by means of a flexible member, for instance a chain.

Gripping device 3 is shown schematically in FIG. 2. This consists of a carrier 4 in the form of a cylindrical housing with closed top side which is attached to the flexible member. A coil 5 is arranged in carrier 4 close to the underside thereof, and two pivots 6 are fixed on the outside. Placed in coil 5 for up and downward movement is a core 7 which is embodied on the underside with a coupling part 8 on which a prong 10 of the gripper is mounted hingedly at 9. On hinge 11 is arranged a pull rod 12 which is coupled hingedly to pivot 6.

The movement of core 7 in downward direction causes spreading of the prongs 10 of the gripper as shown in FIG. 2B.

During closing the core 7 will have to be moved upward, which takes place by generating a determined electric current in coil 5 via a control system 13 which ensures that the core is pulled upward via the generated Lorentz forces.

In the usual magnet coils the pulling force is not constant and, in order to prevent this, the core 7 is embodied with a system of magnets. FIG. 3 shows a preferred embodiment, wherein two magnets 14, 15 are arranged at a mutual distance, which can be done via spacing piece 16. The distance between the centres of magnets 14 and 15 indicated with "c" is greater than the stroke length "s" indicated between FIGS. 2A and 2B. The distance between the magnets, i.e. the length of spacing piece 16, is smaller than the stroke length.

Placing of magnets 14 and 15 in opposite pole position, i.e. the poles of equal type are directed toward each other, here the north pole, provides a combined flux which is of constant type over the distance 16. By energizing the coil this arrangement will ensure that the Lorentz force is also practically constant along the full stroke length.

The invention is not limited to the above described embodiment, in particular not the form of the gripper, which can be embodied with more prongs. The position of the permanent magnets 14, 15 in FIG. 3 can also be embodied in different manner, provided only that a uniform pattern of flux is provided along the stroke length.

What is claimed is:

1. A device for grasping and subsequently displacing an object to a delivery position, comprising a gripper suspended from a trolley and provided with at least three prongs which are each pivotable relative to a carrier and which are displaceable by control means from a spread position to a closing position and vice versa, wherein the control means are formed by a coil connected to the carrier and a magnetic core, which is movable in the coil and coupled to the prongs and which consists of a system of permanent magnets, which coil can be energized by a current; wherein the magnets are arranged in the magnetic system at an axial distance from each other which is smaller than or equal to the stroke length of the core; wherein the magnets are placed in opposite pole position relative to each other, such that their combined flux will form a constant pattern relative to the coil in all positions along the full stroke length, wherein the distance between the centre of the magnets is at least equal to the stroke length of the core.

* * * * *

UNITED STATES PATENT AND TRADEMARK OFFICE
CERTIFICATE OF CORRECTION

PATENT NO. : 6,957,813 B2
DATED : October 25, 2005
INVENTOR(S) : Eric Verstraeten It is certified that error appears in the above-identified patent and that said Letters Patent is hereby corrected as shown below:

<u>Column 1,</u>
Lines 9-11, delete the paragraph beginning: "This principle...".
Line 33, insert the following two paragraphs:
-- The document with the title "Linear magnetic actuator", published in IBM Technical Disclosure Bulletin, IBM Corp., New York, US, vol. 35, No. 3, 1 August 1992, pages 39-40, discloses a method to produce an axial force on a pair of magnets which are surrounded by a coil, where the force is a function of the coil current.

This principle has been used in linear motors to quicken the responsiveness, as described in JP 1111865, published Apr. 27, 1999. --.

Line 37, after "control thereof" insert the following:
-- based on the above mentioned physical principles. --.

Lines 43-45, "are disposed such that their combined flux will form a constant pattern relative to the coil in all positions." should read:
-- are arranged in the magnetic system at an axial distance from each other which is smaller than or equal to the stroke length of the core, wherein the magnets are placed in opposite pole position relative to each other, such that their combined flux will form a constant pattern relative to the coil in all positions along the full stroke length. --.

Signed and Sealed this

Second Day of May, 2006

JON W. DUDAS
*Director of the United States Patent and Trademark Office*